US009776581B2

(12) United States Patent
Oga et al.

(10) Patent No.: US 9,776,581 B2
(45) Date of Patent: Oct. 3, 2017

(54) ATTACHMENT STRUCTURE BETWEEN EXTERIOR MEMBER AND POSTERIOR ATTACHING COMPONENT

(71) Applicant: Yazaki Corporation, Tokyo (JP)

(72) Inventors: Tatsuya Oga, Makinohara (JP);
Hideomi Adachi, Makinohara (JP);
Ryutaro Yamazaki, Toyota (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/007,647

(22) Filed: Jan. 27, 2016

(65) Prior Publication Data

US 2016/0214550 A1    Jul. 28, 2016

(30) Foreign Application Priority Data

Jan. 28, 2015    (JP) .................................. 2015-013963

(51) Int. Cl.
*B60R 16/02*    (2006.01)

(52) U.S. Cl.
CPC ................................ *B60R 16/0215* (2013.01)

(58) Field of Classification Search
None
See application file for complete search history.

(56) References Cited

U.S. PATENT DOCUMENTS

| 2,583,026 | A | * | 1/1952 | Swift | ..................... | H01B 7/188 |
| | | | | | | 156/209 |
| 5,164,546 | A | * | 11/1992 | Kumagai | ............ | B60R 16/0215 |
| | | | | | | 174/135 |
| 5,615,851 | A | * | 4/1997 | LeBeau | ................... | F16B 2/185 |
| | | | | | | 248/73 |
| 6,085,795 | A | * | 7/2000 | Ogawa | ................ | B60R 16/0222 |
| | | | | | | 138/108 |

(Continued)

FOREIGN PATENT DOCUMENTS

| JP | 2014-42443 A | 3/2014 |
| JP | 201482850 A | 5/2014 |

(Continued)

OTHER PUBLICATIONS

Office Action dated Aug. 23, 2016, issued by the Japanese Patent Office in counterpart Japanese Application No. 2015-013963.

*Primary Examiner* — Chau N Nguyen
*Assistant Examiner* — Muhammed Azam
(74) *Attorney, Agent, or Firm* — Sughrue Mion, PLLC

(57) ABSTRACT

An attachment structure between an exterior member and a posterior attaching component to be attached to the exterior member includes: the exterior member that has a tube body shape and is included in a wire harness that has one or a plurality of conductive paths, the exterior member covering the conductive path. The exterior member includes a straight tube section that has a straight shape and is an attachment target section of the posterior attaching component. Multiple protrusions are formed on an outer surface of the straight (Continued)

tube section and include a plurality of protrusion groups arranged in rows, each of the plurality of protrusion groups includes the protrusions arranged at predetermined pitches in a tube axial direction, and the multiple protrusions are configured to be inserted into an annular wall of the posterior attaching component.

5 Claims, 7 Drawing Sheets

(56) References Cited

U.S. PATENT DOCUMENTS

| | | | | |
|---|---|---|---|---|
| 6,126,123 | A * | 10/2000 | Yang | B60R 16/0215 248/74.1 |
| 6,229,091 | B1 * | 5/2001 | Ogawa | B60R 16/0215 174/72 A |
| 6,254,042 | B1 * | 7/2001 | Kogure | H02G 3/26 248/74.1 |
| 6,700,064 | B2 * | 3/2004 | Aoki | B60R 16/0215 174/69 |
| 6,764,050 | B2 * | 7/2004 | Takenaga | B60R 16/0215 24/16 PB |
| 6,791,032 | B2 * | 9/2004 | Doshita | B60R 16/0215 174/135 |
| 6,793,259 | B2 * | 9/2004 | Sano | B60J 5/06 296/155 |
| 6,827,316 | B1 * | 12/2004 | Arai | B60R 16/0215 24/16 PB |
| 6,933,439 | B2 * | 8/2005 | Nishihara | B60R 16/0222 174/481 |
| 7,005,581 | B2 * | 2/2006 | Burnette | H02G 3/0683 174/68.3 |
| 7,019,215 | B2 * | 3/2006 | Arai | F16B 21/086 174/135 |
| 7,151,224 | B2 * | 12/2006 | Kogure | H02G 11/00 174/71 R |
| 7,265,294 | B2 * | 9/2007 | Tsunoda | H02G 11/00 174/135 |
| 7,297,874 | B2 * | 11/2007 | Yasuda | B60R 16/0215 174/135 |
| 7,369,381 | B2 * | 5/2008 | Tsukamoto | B60R 16/0215 174/72 A |
| 7,399,922 | B2 * | 7/2008 | Oga | F16L 3/26 174/135 |
| 7,511,225 | B2 * | 3/2009 | Wiekhorst | H01B 7/0233 174/113 R |
| 7,645,938 | B2 * | 1/2010 | Kogure | B60R 16/0215 174/68.1 |
| 7,938,371 | B2 * | 5/2011 | Oga | F16L 3/1025 248/55 |
| 8,043,513 | B2 * | 10/2011 | Milanovic | B81B 3/0062 216/2 |
| 8,098,115 | B2 * | 1/2012 | Oiwa | B60R 16/0207 333/12 |
| 8,237,054 | B2 * | 8/2012 | Wiekhorst | H01B 11/002 174/110 R |
| 8,569,622 | B2 * | 10/2013 | Katou | B60R 16/0215 138/121 |
| 9,337,633 | B2 * | 5/2016 | Suzuki | H02G 3/088 |
| 9,376,070 | B2 * | 6/2016 | Inao | B60R 16/0215 |
| 9,466,957 | B2 * | 10/2016 | Ichikawa | B60R 16/0207 |
| 2003/0117000 | A1 * | 6/2003 | Barnabo | B60N 2/0224 297/217.1 |
| 2004/0222013 | A1 * | 11/2004 | Lindner | H02G 3/0468 174/135 |
| 2005/0029005 | A1 * | 2/2005 | Arai | H02G 3/30 174/72 A |
| 2005/0118852 | A1 * | 6/2005 | Daito | B60R 16/0215 439/287 |
| 2005/0145410 | A1 * | 7/2005 | Daito | H02G 3/0418 174/72 A |
| 2006/0144610 | A1 * | 7/2006 | Gelibert | F16L 3/227 174/72 A |
| 2006/0273226 | A1 * | 12/2006 | Jatzke | F16L 3/223 248/68.1 |
| 2008/0023223 | A1 * | 1/2008 | Suzuki | H02G 3/0481 174/72 A |
| 2010/0043225 | A1 * | 2/2010 | Oga | B60R 16/0207 29/857 |
| 2010/0045106 | A1 * | 2/2010 | Oga | B60R 16/0215 307/10.1 |
| 2010/0096184 | A1 * | 4/2010 | Ambo | B60R 16/0215 174/72 A |
| 2011/0094796 | A1 * | 4/2011 | Toyama | B60R 16/0207 174/72 A |
| 2012/0124782 | A1 * | 5/2012 | Elsner | B60R 16/0215 24/115 A |
| 2012/0132465 | A1 * | 5/2012 | Mabuchi | H02G 3/32 174/72 A |
| 2014/0131528 | A1 * | 5/2014 | Blakeley | H02G 3/32 248/74.2 |
| 2014/0238719 | A1 * | 8/2014 | Inao | B60R 16/0215 174/112 |
| 2014/0246231 | A1 * | 9/2014 | Adachi | B60R 16/0215 174/72 A |
| 2014/0251681 | A1 * | 9/2014 | Adachi | B29C 63/42 174/72 A |
| 2014/0311796 | A1 * | 10/2014 | Gannon | H01B 7/2825 174/72 A |
| 2015/0000975 | A1 * | 1/2015 | Matsuda | B60R 16/0215 174/72 A |
| 2015/0048221 | A1 * | 2/2015 | Doushita | H02G 3/04 248/71 |
| 2015/0083462 | A1 * | 3/2015 | Yoshida | F16B 2/06 174/136 |
| 2015/0136479 | A1 * | 5/2015 | Oga | H01B 1/023 174/72 A |
| 2015/0136482 | A1 * | 5/2015 | Adachi | B60R 16/0215 174/72 A |
| 2015/0136483 | A1 * | 5/2015 | Inao | H01B 7/2825 174/72 A |
| 2015/0222102 | A1 | 8/2015 | Sugimoto | |
| 2016/0144807 | A1 * | 5/2016 | Inao | H02G 3/0468 174/72 A |
| 2016/0268019 | A1 * | 9/2016 | Kanagawa | H02G 3/0468 |
| 2016/0372907 | A1 * | 12/2016 | Suenaga | H01B 7/0045 |
| 2017/0004903 | A1 * | 1/2017 | Suenaga | F16B 2/08 |

FOREIGN PATENT DOCUMENTS

| | | |
|---|---|---|
| JP | 2014241666 A | 12/2014 |
| WO | 2014017548 A1 | 1/2014 |

* cited by examiner

ATTACHMENT STRUCTURE BETWEEN EXTERIOR MEMBER AND POSTERIOR ATTACHING COMPONENT

CROSS REFERENCE TO RELATED APPLICATION

This application is based on Japanese Patent Application (No. 2015-13963) filed on Jan. 28, 2015, the contents of which are incorporated herein by reference. Also, all the references cited herein are incorporated as a whole.

BACKGROUND OF THE INVENTION

1. Technical Field

One or more embodiments of the present invention relate to an attachment structure between an exterior member of a wire harness and a posterior attaching component which is posteriorly attached to the exterior member.

2. Background Art

For example, a wire harness is used to electrically connect high voltage machines mounted in a hybrid automobile or an electric automobile. Patent Document 1 to be described below discloses a wire harness which is configured to include a conductive path and a synthetic resin exterior member which protects the conductive path. The exterior member includes a flexible tube section having a bellows tube shape and a straight tube section having a straight tube shape such that the wire harness is wired in a complicated three-dimensional space. The exterior member is formed of a resin such that the flexible tube section and the straight tube section are continuous.

In the wiring, a clamp is attached around the straight tube section of the exterior member and the wire harness is fixed to a vehicle through the clamp. A clamp attaching section of the straight tube section as an attachment target of the clamp is configured to have a pair of movement regulating portions and an attachment-detachment portion between the pair of movement regulating portions. An outer surface of the straight tube section protrudes in an annular manner, and thereby the pair of movement regulating portions are formed. The pair of movement regulating portions are formed as portions which regulate movement of the clamp in a tube axial direction. Further, the attachment-detachment portion between the pair of movement regulating portions is the outer surface of the straight tube section. The clamp is directly attached to be posterior on the outer surface of the straight tube section.

The clamp attaching section is formed as a part of the configuration described above, and thus is characterized by a fact that an attachment position of the clamp is easily found.

Patent Document 1 is JP-A-2014-42443.

SUMMARY OF THE INVENTION

Incidentally, in the related art described above, since the attachment position of the clamp is determined, and then the clamp is attached at the position, it may be difficult to cope with a case where an attachment position of the clamp is changed in the wiring of the wire harness.

In addition, in the related art described above, since a long wire harness is provided and thus, the long exterior member is provided, the following problems may arise.

In other words, the exterior member has a straight tube section formed to be elongated, and the straight tube section needs to have a certain level of rigidity such that the shape is maintained in the straight state after the wiring of the wire harness. However, since the flexible tube section having the bellows tube shape, which is continuous to the straight tube section, is formed to be thin in thickness and has to be a bendable section, the straight tube section may, conversely, become thick in thickness such that rigidity is increased, which results in constraints on resin molding.

In addition, when the straight tube section is merely increased in thickness, the weight is increased as a whole, and, as a result, it may be difficult to achieve a lightweight wire harness.

One or more embodiments of the present invention are provided in consideration of the circumstances described above, and thus, an object thereof is to provide an attachment structure between an exterior member and a posterior attaching component in which it is possible to flexibly dispose an attachment position of the posterior attaching component and it is possible to increase rigidity.

According to a first aspect of the embodiment, there is provided an attachment structure between an exterior member and a posterior attaching component to be attached to the exterior member, the attachment structure including: the exterior member that has a tube body shape and is included in a wire harness that has one or a plurality of conductive paths, the exterior member covering the conductive path, wherein the exterior member includes a straight tube section that has a straight shape and is an attachment target section of the posterior attaching component, multiple protrusions, which protrude with a predetermined height, are formed on an outer surface of the straight tube section, the multiple protrusions include a plurality of protrusion groups arranged in rows, each of the plurality of protrusion groups includes the protrusions arranged at predetermined pitches in a tube axial direction, and the multiple protrusions are configured to be inserted into an annular wall of the posterior attaching component.

According to a second aspect of the embodiment, in the attachment structure between the exterior member and the posterior attaching component according to the first aspect, the protrusions may be arranged in a state in which positions thereof are shifted by half of a length of the predetermined pitch in the tube axial direction, in one protrusion group and an adjacent protrusion group adjacent to the one protrusion group of the plurality of protrusion groups.

According to a third aspect of the embodiment, in the attachment structure between the exterior member and the posterior attaching component according to the first aspect, each of the protrusions may have substantially a rectangular shape in a plan view in which a width in a circumferential direction of the outer surface is longer than a width in the tube axial direction.

According to a fourth aspect of the embodiment, in the attachment structure between the exterior member and the posterior attaching component according to the first aspect, in which the posterior attaching component may be a clamp which has a tube body attaching section which is attached to the straight tube section and a fixing section which is fixed to a fixing target in wiring of the wire harness, and the annular wall may be disposed at an near-end position and/or at an intermediate position of the tube body attaching section in the tube axial direction on the inner surface thereof.

In the embodiment according to the first aspect, since the protrusion groups, which are formed of the multiple protrusions, are formed on the outer surface of the straight tube section in the exterior member, it is possible to adjust the attachment position of the posterior attaching component depending on the pitch at which the protrusions are arranged. In other words, in a case where the attachment position of the posterior attaching component needs to be changed, it is possible to easily cope with the change when the insertion position of the annular wall formed in the posterior attaching component is changed. Accordingly, according to the present embodiment, an effect that it is possible to flexibly dispose the attachment position of the posterior attaching component is achieved. In addition, according to the embodiment, since multiple protrusions are formed on the outer surface of the straight tube section, it is possible for the straight tube section to obtain rigidity due to the multiple protrusions and further due to the arrangement state in the plurality of rows. Accordingly, according to the embodiment, an effect that it is possible to increase the rigidity is achieved.

In the embodiment according to the second aspect, the positions of the protrusions are shifted in the one protrusion group and the adjacent protrusion group of the plurality of protrusion groups. Therefore, even when the attachment position of the posterior attaching component needs to be more finely adjusted, an effect that it is possible to easily cope with the fine adjustment is achieved.

In the embodiment according to the third aspect, since the protrusions are formed to have substantially the rectangular shape which has the width in the tube axial direction longer than the width in the circumferential direction of the outer surface, the shape causes movement of the posterior attaching component in the tube axial direction to be easily regulated and the shape causes rotation of the posterior attaching component to be easily guided. As a result, an effect that it is possible to contribute to improvement of workability in the wiring of the wire harness is achieved.

In the embodiment according to the fourth aspect, since the clamp is employed as the posterior attaching component, an effect that it is possible to flexibly dispose the attachment position of the clamp is achieved. In addition, according to the embodiment, an effect that it is possible to set the annular wall which is inserted into between the protrusions at more appropriate positions is achieved.

BRIEF DESCRIPTION OF THE DRAWINGS

FIG. 1A is a view schematically illustrating a wiring state of a high-voltage wire harness and FIG. 1B is a view schematically illustrating a wiring state of another wire harness than FIG. 1A.

FIG. 4A is a view illustrating a state in which protrusions are arranged such that positions thereof are shifted in one protrusion group and an adjacent protrusion group and FIG. 4B is a view illustrating a state in which positions thereof are not shifted but pitches are narrowed, unlike the state in FIG. 4A.

FIG. 5A is a view illustrating a state in which protrusions are arranged such that the positions thereof are shifted in the one protrusion group and the adjacent protrusion group and FIG. 5B is a view illustrating a state in which the positions thereof are not shifted but pitches are narrowed, unlike the state in FIG. 5A.

FIG. 7A is a sectional view in a direction orthogonal to a tube axis, FIG. 7B is a sectional view taken along A-A line in FIG. 7A, FIG. 7C is a sectional view illustrating another example.

DETAILED DESCRIPTION OF THE EXEMPLARY EMBODIMENTS

In an attachment structure of an exterior member of a wire harness and a posterior attaching component which is posteriorly attached to the exterior member, a protrusion group which is formed of multiple protrusions on the outer surface of the straight tube section of the exterior member is formed and disposed and a clamp having an annular wall is posteriorly attached.

EXAMPLE

Figure 1A:
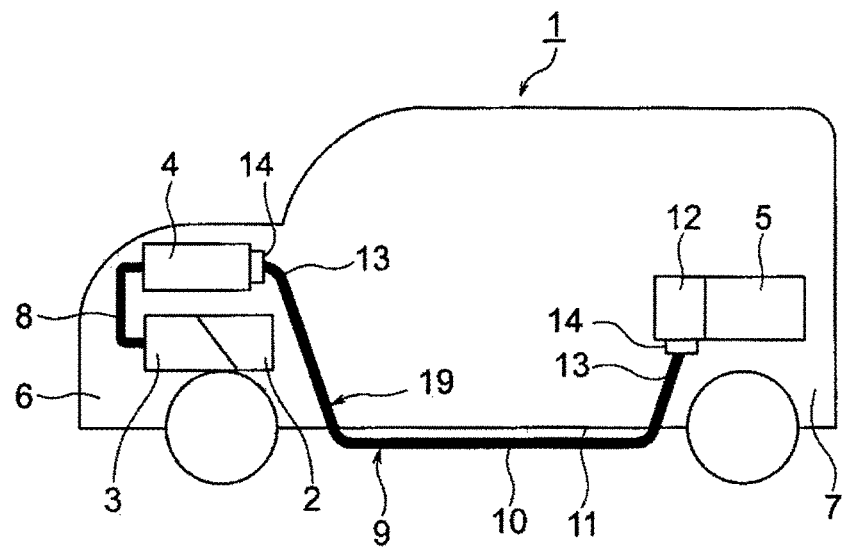
FIGS. 1A and 1B are views of wire harnesses which employ a structure according to an embodiment of the present invention.
Figure 1B:
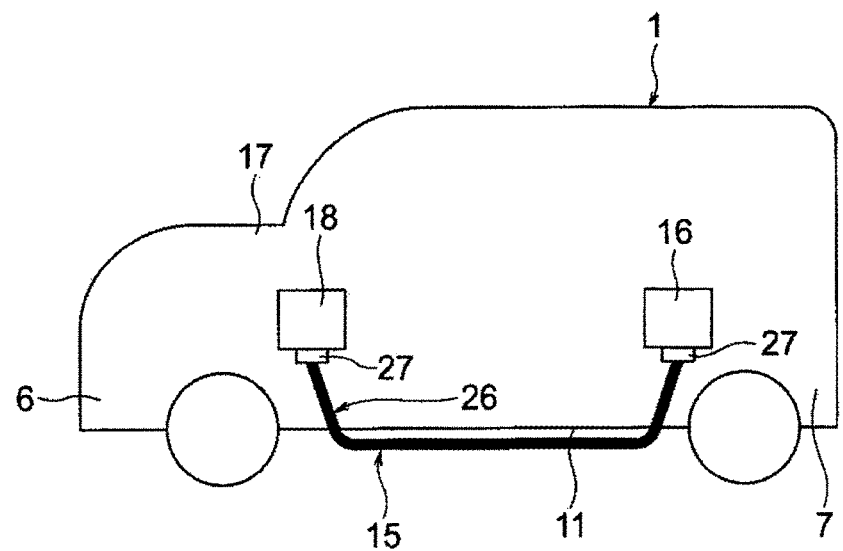
Figure 2:
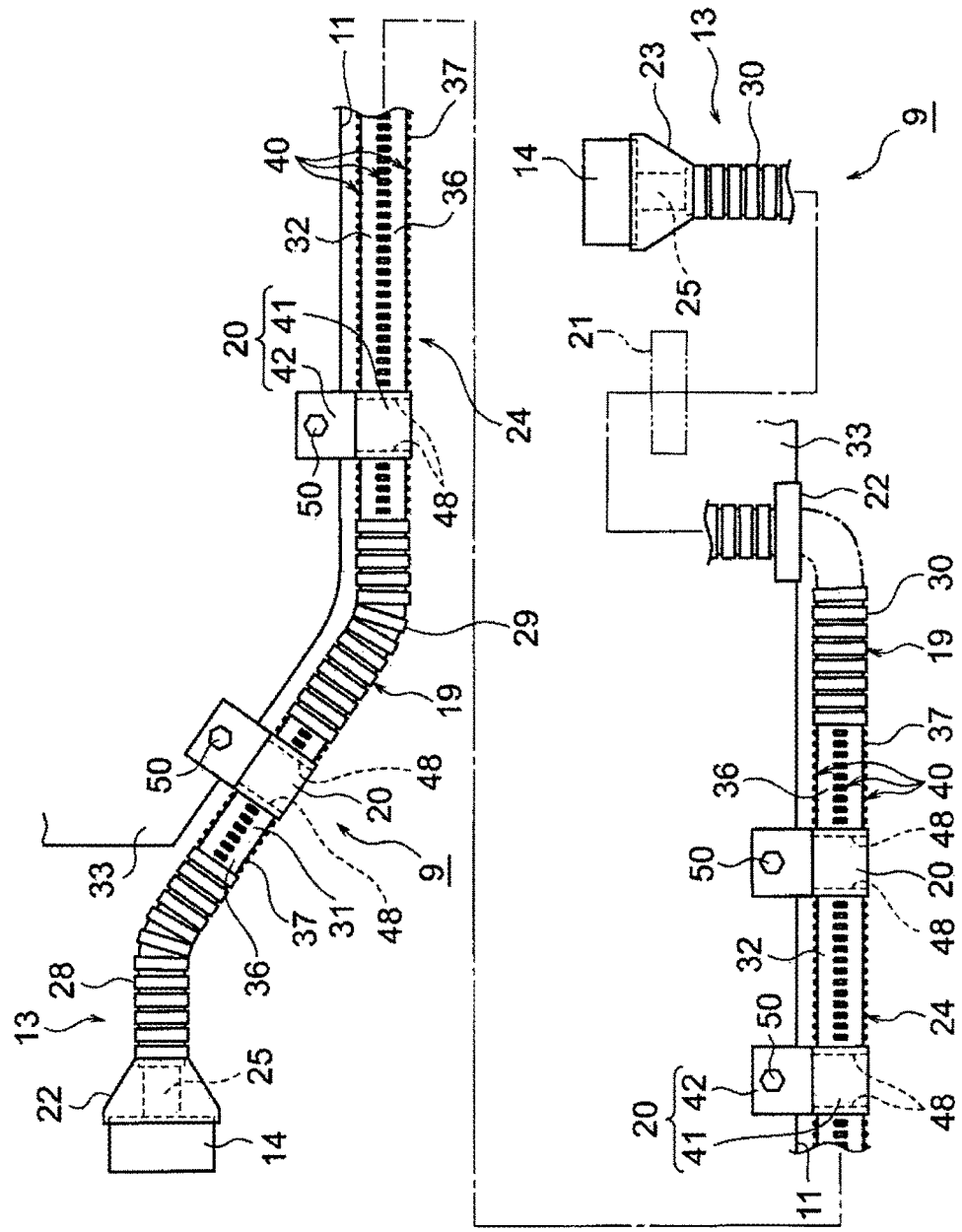
FIG. 2 is a view of an outline illustrating a configuration and a fixing state of the wire harness in FIG. 1A.
Figure 3:
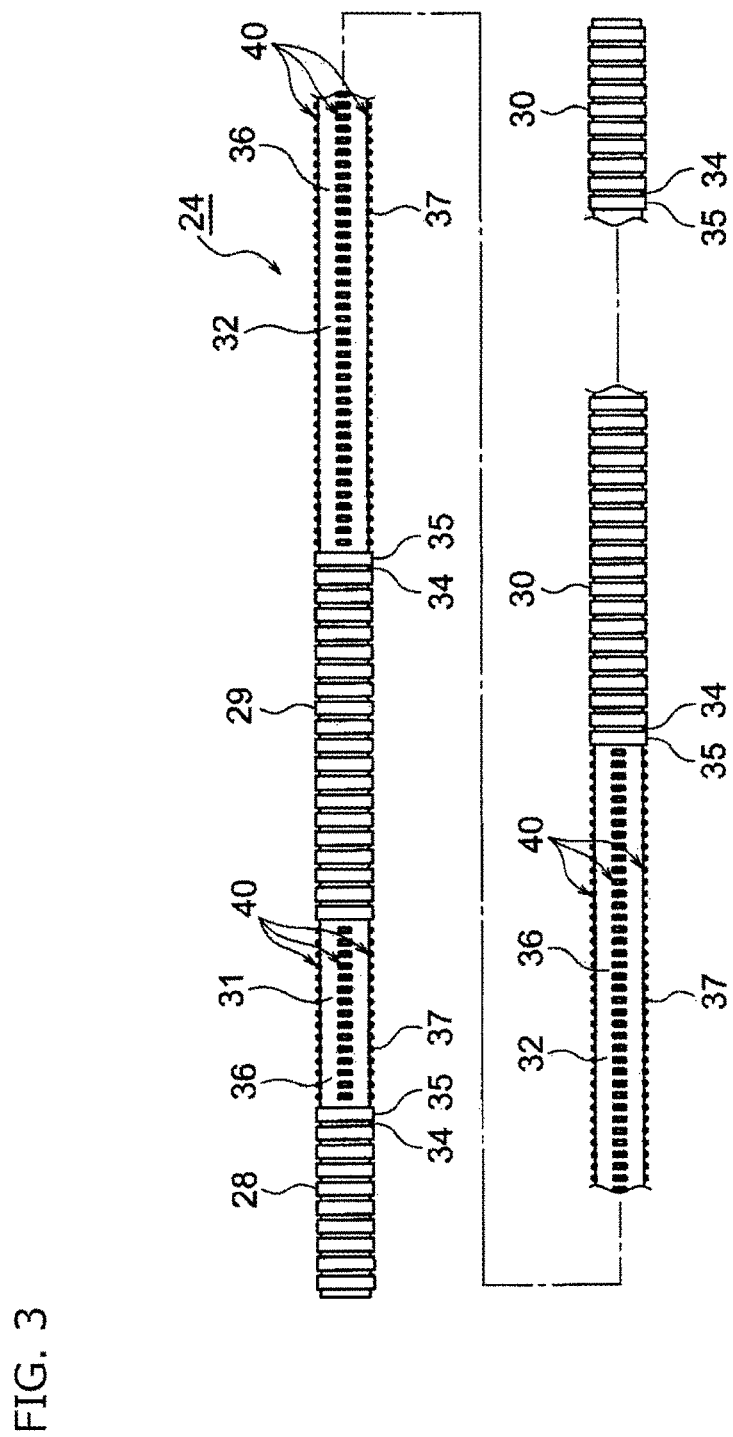
FIG. 3 is a view of an exterior member in FIG. 2.
Figure 4A:
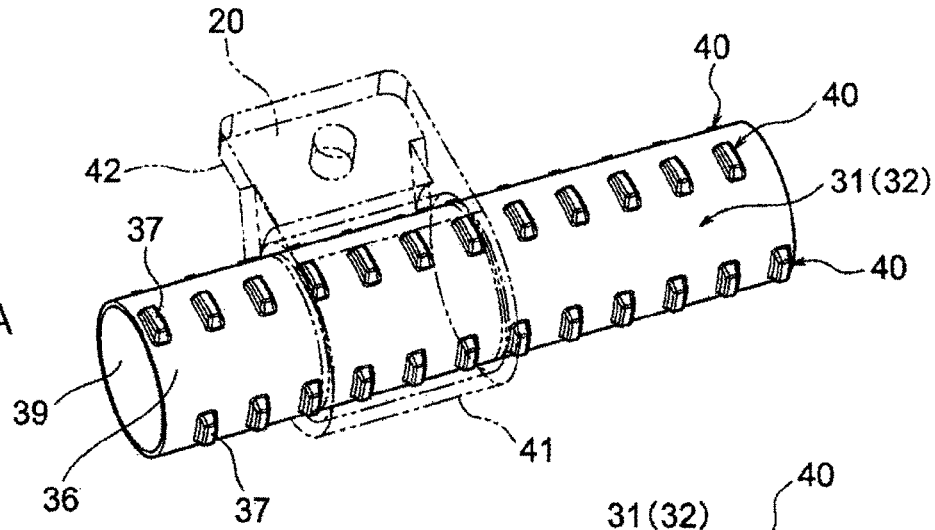
FIGS. 4A and 4B are perspective views of straight tube sections.
Figure 4B:
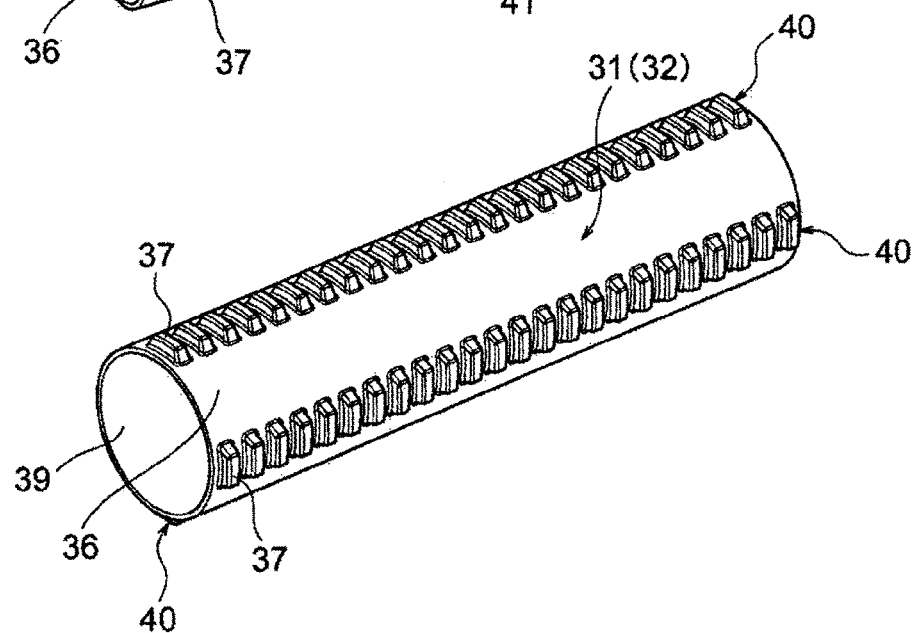
Figure 5A:
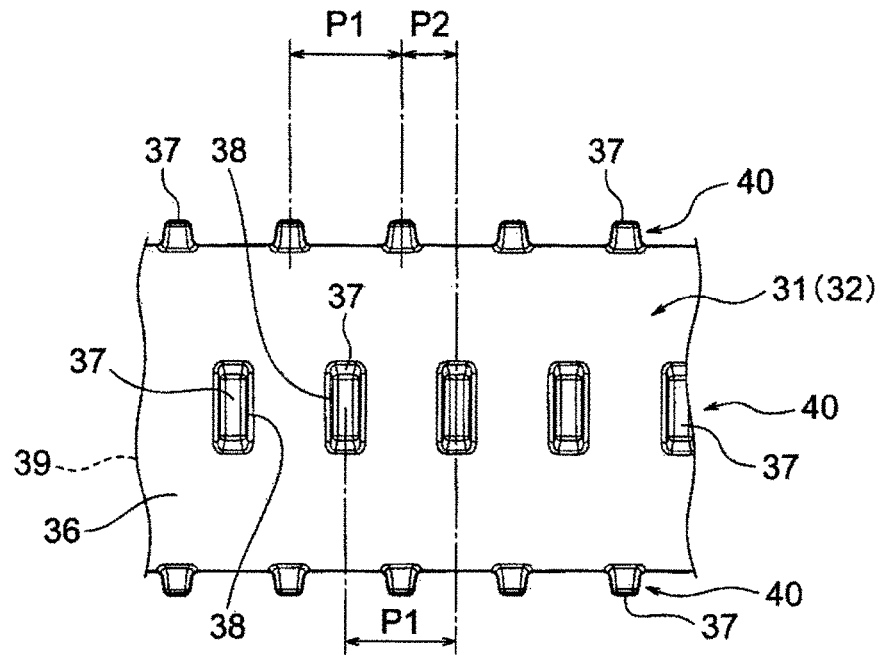
FIGS. 5A and 5B are enlarged views of main parts of the straight tube sections.
Figure 5B:
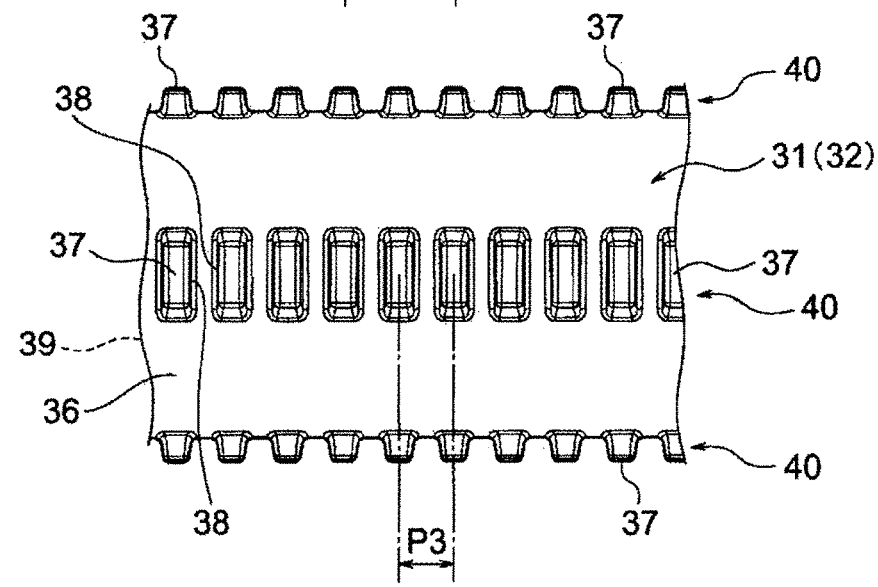
Figure 6:
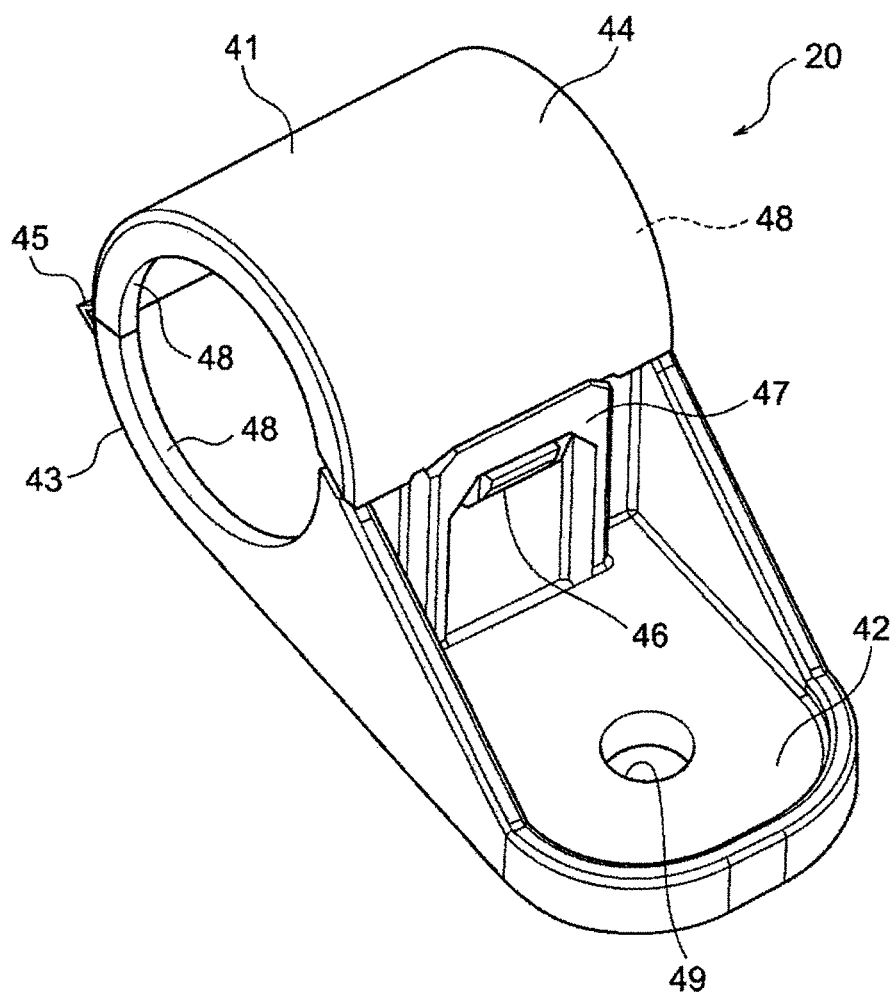
FIG. 6 is a perspective view of a clamp in FIG. 2.
Figure 7A:
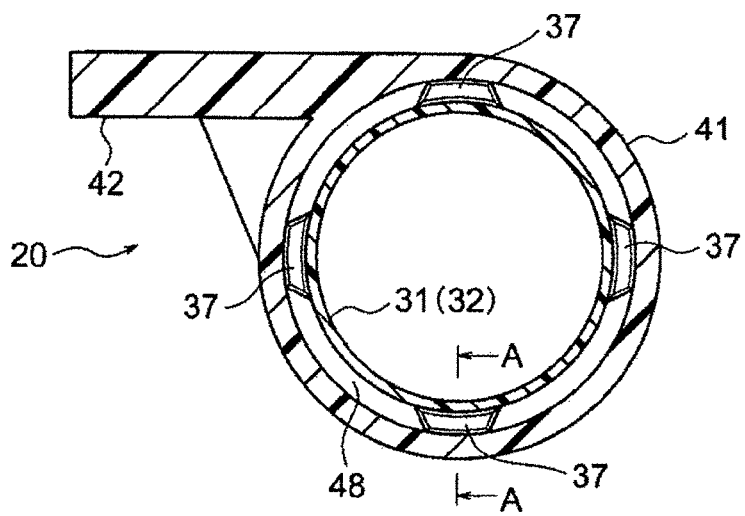
FIGS. 7A to 7C are sectional views of an attachment section between the straight tube section and the clamp.
Figure 7B:
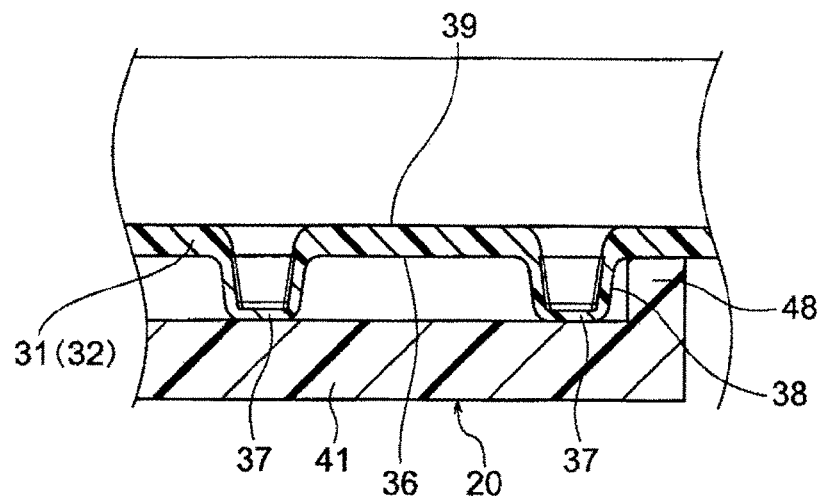
Figure 7C:
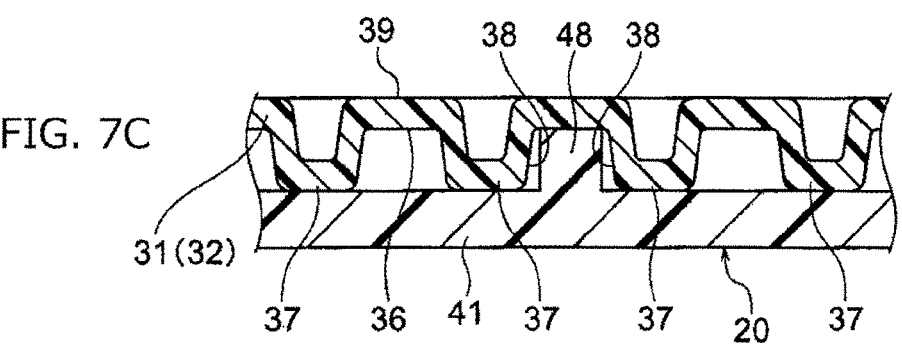

Hereinafter, Example 1 will be described with reference to the drawings. FIGS. 1A and 1B are views of wire harnesses which employ a structure according to the present invention; FIG. 1A is a view schematically illustrating a wiring state of a high-voltage wire harness and FIG. 1B is a view schematically illustrating a wiring state of another wire harness than FIG. 1A. FIG. 2 is a view of an outline illustrating a configuration and a fixing state of the wire harness in FIG. 1A. FIG. 3 is a view of an exterior member in FIG. 2. FIGS. 4A and 4B are perspective views of straight tube sections. FIGS. 5A and 5B are enlarged views of main parts of the straight tube sections. FIG. 6 is a perspective view of a clamp in FIG. 2. FIGS. 7A to 7C are sectional views of an attachment section between the straight tube section and the clamp.

In the present example, the present invention is employed to the wire harness which is wired in a hybrid automobile (or an electrical automobile and the like).

In FIG. 1A, reference sign 1 represents the hybrid automobile. The hybrid automobile 1 is a vehicle which is driven by mixing two types of power from an engine 2 and a motor unit 3 and power from a battery 5 (battery pack) is supplied to the motor unit 3 through an inverter unit 4. The engine 2, the motor unit 3, and the inverter unit 4 are mounted in an engine room 6 at a position at which front wheels or the like are disposed in the present example. In addition, the battery 5 is mounted in a rear automobile section 7 in which rear wheels or the like are disposed (may be mounted in the interior of an automobile which exists on the rear side of the engine room 6).

The motor unit 3 and the inverter unit 4 are connected by a high-voltage (for high voltage) wire harness 8. In addition, the battery 5 and the inverter unit 4 are also connected through a high-voltage wire harness 9. The wire harness 9 has an intermediate section 10 which is wired on a vehicle underfloor 11. In addition, the wire harness 9 is wired substantially in parallel along the vehicle underfloor 11. The vehicle underfloor 11 is a known body and is a so-called panel member and a through-hole is formed at a predetermined position. The wire harness 9 is inserted into the through-hole in a water-tight manner.

The wire harness 9 and the battery 5 are connected through a junction block 12 provided in the battery 5. To the junction block 12, exterior connection means such as a shielded connector 14 disposed on a harness end 13 of the wire harness 9 on the rear end side is electrically connected. In addition, the wire harness 9 and the inverter unit 4 are electrically connected through external connection means such as the shielded connector 14 disposed on the harness end 13 on the front end side.

The motor unit 3 is configured to have a motor and a generator. In addition, the inverter unit 4 is configured to have an inverter and a converter. The motor unit 3 is formed as a motor assembly having a shield case. In addition, the inverter unit 4 is also formed as an inverter assembly having a shield case. The battery 5 is formed of a Ni-MH based or Li-ion based material and is modularized. Further, it is possible to use an electrical storage device such as a capacitor. It is needless to say that there is not particular limitation to the battery 5 as long as the battery can be used in the hybrid automobile 1 or in an electrical automobile.

In FIG. 1B, reference sign 15 represents a wire harness. A wire harness 15 is a low-voltage (for low voltage) harness and a low-pressure battery 16 of the rear automobile section 7 in the hybrid automobile 1 and auxiliary equipment 18 (machine) mounted in a front automobile section 17 are electrically connected. Similar to the wire harness 9 in FIG. 1A, the wire harness 15 is wired through the vehicle underfloor 11 (as an example, and may be wired through a vehicle interior side).

As illustrated in FIGS. 1A and 1B, high-voltage wire harnesses 8 and 9 and the low-voltage wire harness 15 are wired. The present invention can be applied to any wire harness; however, the wire harness 9, as a representative example, will be described below.

In FIG. 1A and FIG. 2, the long wire harness 9 which is wired through the vehicle underfloor 11 is configured to include a harness main body 19, and the shielded connectors 14 (external connection means) which are disposed on both ends, that is, the harness ends 13, respectively, of the harness main body 19. In addition, the wire harness 9 is configured to include a plurality of clamps 20 (posterior attaching member) and other fixing members 21 which are fixed at predetermined positions of a vehicle, and water-stop members 22 and 23 (for example, a grommet or boots) which regulate infiltration of the moisture water.

In FIG. 2, the harness main body 19 is configured to include an exterior member 24 and a high-voltage conductive path 25 (conductive path) which is accommodated and protected in the exterior member 24. Further, the exterior member 24 may employ a structure in which the low-voltage wire harnesses 15 are collectively accommodated and protected (low-voyage harness 15 described above is configured to include a harness main body 26 and connector 27 disposed on both ends of the harness main body 26 (refer to FIG. 1B).

In FIG. 2 and FIG. 3, the exterior member 24 is molded of a resin by using a device by an air blowing method or a vacuum system and is formed to have one straight tube body shape (straight before use). In the exterior member 24, flexible tube sections 28 to 30 with flexibility and straight tube sections (short straight tube section 31 and long straight tube section 32) as a portion, in which wiring is performed in the straight manner, are formed. In the present example, the flexible tube section and the straight tube section are alternately arranged such that a flexible tube section 28, the short straight tube section 31, the flexible tube section 29, the long straight tube section 32, and a flexible tube section 30 are arranged from the left side in the drawing (from the front end side of the wire harness 9).

The flexible tube sections 28 to 30 are formed and arranged by matching each bending position and each bending length of the fixing target 33 (wiring destination of the wire harness). The lengths of the flexible tube sections 28 to 30 are not the same and the length which is required to match the fixing target 33. The flexible tube sections 28 to 30 are deflected at a predetermined angle in a packed state or in transport of the wire harness 9, and in wiring of the route to the vehicle. It is possible for the flexible tube sections 28 to 30 to be deflected and to enter a bending state and the flexible tube sections are formed to return to a straight original state (state in the resin molding) as illustrated in FIG. 3.

The flexible tube sections 28 to 30 are formed to have a bellows tube shape in the present example (no particular limitation to the shape, as long as the sections are flexible). Specifically, the flexible tube sections are formed to have bellows concave portions 34 and bellows convex portions 35 in the circumferential direction and the bellows concave portions 34 and the bellows convex portions 35 are formed to be alternately continuous in the tube axial direction.

The short straight tube section 31 and the long straight tube section 32 are formed as portions which do not have flexibility, unlike the flexible tube sections 28 to 30. In addition, the short straight tube section 31 and the long straight tube section 32 are formed as a portion which does not bend in the packed state or in transport and in the wiring of the route (portion, which does not bend, means a portion, which does not have active flexibility). The short straight tube section 31 and the long straight tube section 32 are formed to have the tube body shape which straightly extends.

In FIG. 2 to FIG. 5B, multiple protrusions 37 are formed to have a predetermined height on outer surfaces 36 of the short straight tube section 31 and the long straight tube section 32. Each of the protrusions 37 is formed to have substantially a rectangular shape in a plan view (refer to FIGS. 5A and 5B, and the shape as an example). In other words, the protrusion 37 is formed to have a width W2 in the circumferential direction of the outer surface longer (here, not long enough to form a rib shape) than a width W1 in the tube axial direction.

A side surface represented by reference sign 38 in the protrusion 37 is formed as a surface which is capable of coming into contact with or sliding on an annular wall 48, to be described below, of the clamp 20 (with the width W2 being longer, it is effective for the coming into contact or the sliding). Further, it is known in the following description; however, since the protrusion 37 has the short width W1 in the tube axial direction, it is possible to set a pitch P1 (or P3) between the adjacent protrusions 37 to be narrowed. In this manner, the shape is effective in adjustment of the attachment position of the clamp 20.

The multiple protrusions 37 are formed as a portion which is effective for increasing the rigidity of the short straight tube section 31 and the long straight tube section 32. The multiple protrusions 37 are formed, and by setting a thickness from the outer surface 36 to the inner surface 39 of the short straight tube section 31 and the long straight tube section 32, that is, to be relatively thin, it is possible to secure the minimum necessary rigidity.

As understood in the drawing, the multiple protrusions 37 are arranged and formed with regularity. To be more specific, the protrusions 37 are arranged and formed to be aligned at predetermined pitches (in FIG. 5A, pitch P1) in the tube axial direction. The protrusions 37 are aligned in the tube axial direction, and thereby a protrusion group 40 is formed as illustrated in the drawing. Four rows of the protrusion groups 40 are formed (the number of rows is an example). The four rows of protrusion groups 40 are arranged at 90-degrees pitch in the rotation direction around the tube axis. In addition, the four rows of protrusion groups 40 are arranged from one end to the other end of the short straight tube section 31 and the long straight tube section 32.

In FIGS. 5A and 4A, the protrusions 37 are arranged and formed in a state in which the positions thereof are shifted by a half (by P2) of the length of the pitch P1 in the tube axial direction in one protrusion group 40 and an adjacent protrusion group 40 of the four rows of protrusion groups 40. Further, the protrusions may be arranged as in the state illustrated in FIGS. 5B and 4B without shifting the position. In this case, it is possible to narrow the pitch P3 between the adjacent protrusions 37 to P2 described above.

The four rows of protrusion groups 40 are formed such that interval portions between the adjacent protrusions 37 become insertion portions of the annular wall 48 of the clamp 20, which will be described below. In other words, the interval portions are formed to match to a thickness of the annular wall 48.

Since the four rows of protrusion groups 40 described above are formed on the outer surface 36 of the short straight tube section 31 and the long straight tube section 32 (since multiple protrusions 37 are formed), it is possible to attach the clamp 20 at any position (it can be said that the attachment position of the clamp 20 is not specified).

In FIG. 2, the high-voltage conductive path 25 is the conductive path which is accommodated and protected in the exterior member 24 as described above, and the high-voltage conductive path is configured to have one or a plurality of high-voltage electric wires and shield members which cover the high-voltage electric wires (as an example, and may be configured to further include sheaths).

The high-voltage electric wire is configured to include a conductor and an insulating member that covers the conductor. The high-voltage electric wire is formed to have a length which is necessary for an electrical connection. The high-voltage electric wire is formed to be long because the wire harness 9 electrically connects the inverter unit 4, the battery 5 (refer to FIG. 1A, junction block 12).

The conductor is manufactured by using copper, a copper alloy, or aluminum or an aluminum. The conductor may employ a conducting structure in which wires are cabled or a rod-shaped conducting structure which has a rectangular shape or a round shape in a sectional view (the conducting structure having the straight angle single core or round single core, and in this case, the wire itself has the rod shape). Regarding the conductor as described above, an insulating member, which is made of a resin material having insulating properties, is formed through extrusion molding.

Further, in the present example, as the high-voltage electric wire, a known product is employed; however, the product is not limited thereto. In other words, a high-voltage circuit, in which an insulating member is provided on a known bus bar, may be employed.

The insulating member is formed, by the extrusion molding, on the outer circumferential surface of the conductor, by using a thermoplastic resin material. The insulating member is formed as a sheath having a circular shape in the sectional view. The insulating member is formed to have a predetermined thickness. As the thermoplastic resin material, it is possible to use various types of known materials and the material is appropriately selected from polymer materials, such as, a polyvinyl chloride resin, a polyethylene resin, and a polypropylene resin.

The shield member is an electromagnetic shielding member (shielding member for electromagnetic wave countermeasures) which collectively covers the high-voltage electric wires and a known braid, which is formed by braiding the multiple wires into a cylindrical shape, may be employed. The shield member is formed to have substantially the same length as the entire length of the high-voltage electric wire. The end portion of the shield member is connected to a shield case or the like (not illustrated) of the inverter unit 4 (refer to FIG. 1A) through the shielded connector 14 (refer to FIG. 1A). Further, the shield member may employ a member including metallic foils having conductivity or a member including the metallic foils as long as it is possible to cope with the electromagnetic wave. In addition, the shield member may be assembled in a state in which the sheet-shaped shield member is formed to be wound.

Referring to FIG. 2, FIG. 4A, FIG. 6, and FIGS. 7A to 7C, the clamp 20 is posteriorly attached to the short straight tube section 31 and the long straight tube section 32 and is formed so as to be fixed to the fixing target 33 in the wiring of the wire harness 9. The clamp 20 is a resin molded product having a tube body attaching section 41 and a vehicle body fixing section 42 (fixing section).

The tube body attaching section 41 is a section having substantially a cylindrical shape which is attached to the short straight tube section 31 and the long straight tube section 32, and is formed to have a two-part structure. In FIGS. 6 to 7C, when the tube body attaching section 41 is described in more detail to some extent, the tube body attaching section 41 has a main body 43 having a semi-cylindrical shape, a cover 44 having the same semi-cylindrical shape, a hinge 45 which freely opens and closes the main body 43 and the cover 44, a main-body-side locking portion 46, and a cover-side locking portion 47. A pair of annular walls 48 are formed in the inner surface of the tube body attaching section 41.

As described above, the pair of annular walls 48 are portions which are inserted into between the protrusion group 40 and the adjacent protrusion 37, and are formed as a wall-shaped (rib-shaped) portion so as to extend on the outer surface of the short straight tube section 31 and the long straight tube section 32 in the circumferential direction. The pair of annular walls 48 are arranged and formed at an near-end position in the inner surface of the tube body attaching section 41 in the tube axial direction (as an example, and as illustrated in FIG. 7C, may be arranged and formed by one at an intermediate position of the inner surface, or may be arranged and formed by being assembled at the intermediate and end portions).

The vehicle body fixing section 42 is formed to have a cantilever shape and is integral to the tube body attaching section 41. A bolt insertion hole 49 is formed in the vehicle body fixing section 42. The clamp 20 is fixed by bolt and nut 50 (refer to FIG. 2) which is inserted into the bolt insertion hole 49 of the vehicle body fixing section 42.

The clamp 20 according to the present example is attached to the short straight tube section 31 and the long straight tube section 32 through the tube body attaching section 41. When the attachment is performed, the movement in the tube axial direction is regulated by the contact between the annular wall 48 and the protrusion 37. Further, the clamp 20 enters a state in which it is possible to be rotated around the tube axis.

In the configuration and the structure described above, the wire harness 9 is manufactured in the following procedure. In other words, the high-voltage conductive path 25 is inserted into the exterior member 24, then the shielded connectors 14 are provided at the end portions of the high-voltage conductive path 25, and the wire harness 9 is manufactured. In addition, the clamp 20 is attached to the short straight tube section 31 and the long straight tube section 32 of the exterior member 24, and another fixing member 21 is attached to the flexible tube section 30, and the wire harness 9 is manufactured. Further, the grommet (water-stop member 22) is assembled to the flexible tube section 30 in advance.

The wire harness 9 is manufactured as described above, then a predetermined packing is performed, and then the wire harness 9 is transported to a vehicle assembly site. At the vehicle assembly site, the wire harness 9 is attached to the vehicle and fixed from the portions corresponding to the vehicle underfloor 11. When a series of operations regarding attachment and fixing are completed, the wire harness 9 enters a state in which wiring is performed through a desirable route.

As above, as described with reference to FIG. 1A to FIG. 7C, protrusion groups 40 formed of multiple protrusions 37 are formed on the outer surface 36 of the short straight tube section 31 and the long straight tube section 32 in the exterior member 24. Therefore, it is possible to adjust the attachment position of the clamp 20 according to the pitch P1 (or P3) at which the protrusions 37 are arranged. In other words, in a case where the attachment position of the clamp 20 is changed, it is possible to easily cope with the change of the insertion position of the annular wall 48 formed in the clamp 20.

Accordingly, according to the present embodiment, an effect that it is possible to flexibly arrange the attachment position of the clamp 20 is achieved. In addition, according to the present embodiment, since the multiple protrusions 37 are formed on the outer surfaces 36 of the short straight tube section 31 and the long straight tube section 32, it is possible for the short straight tube section 31 and the long straight tube section 32 to obtain rigidity due to the multiple protrusions 37 and due to the arrangement state of the plurality of rows. Accordingly, according to the present invention, an effect that it is possible to increase the rigidity is achieved.

It is needless to say that it is possible to modify and realize the present invention in various manners within a scope without departing from the gist of the present invention.

In the description above, as the posterior attaching component, the clamp 20 is described; however, the posterior attaching component is not limited to the clamp 20, and clips and protectors may be used. In addition, the protrusion group 40 illustrated in FIG. 5A and FIG. 4A may be applied to the short straight tube section 31, and the protrusion group 40 illustrated in FIG. 5B and FIG. 4B may be applied to the long straight tube section 32 (the reverse may be also employed).

What is claimed is:

1. An attachment structure between an exterior member and a posterior attaching component to be attached to the exterior member, the attachment structure comprising:
   the exterior member that has a tube body shape and is included in a wire harness that has at least one conductive path, the exterior member covering the conductive path, wherein
   the exterior member comprises:
      a straight tube section that has a straight shape and is an attachment target section of the posterior attaching component, and
      multiple protrusions, which protrude with a predetermined height, formed on an outer surface of the straight tube section, wherein
   the multiple protrusions include a plurality of protrusion groups arranged in rows, each of the plurality of protrusion groups includes the protrusions arranged at predetermined pitches in a tube axial direction,
   the multiple protrusions are configured to be inserted into an annular wall of the posterior attaching component, and
   the posterior attaching component is a clamp that has a tube body attaching section which is attached to the straight tube section and a fixing section which is fixed to a fixing target in wiring of the wire harness.

2. The attachment structure according to claim 1, wherein the protrusions are arranged in a state in which positions thereof are shifted by half of a length of the predetermined pitch in the tube axial direction, in one protrusion group and an adjacent protrusion group adjacent to the one protrusion group of the plurality of protrusion groups.

3. The attachment structure according to claim 1, wherein each of the protrusions has substantially a rectangular shape in a plan view in which a width in a circumferential direction of the outer surface is longer than a width in the tube axial direction.

4. The attachment structure according to claim 1, wherein the annular wall is disposed at an intermediate position of the tube body attaching section in the tube axial direction on an inner surface thereof.

5. The attachment structure according to claim 1, wherein the annular wall is disposed at a near-end position of the tube body attaching section in the tube axial direction on an inner surface thereof.

* * * * *